United States Patent Office 2,750,212
Patented June 12, 1956

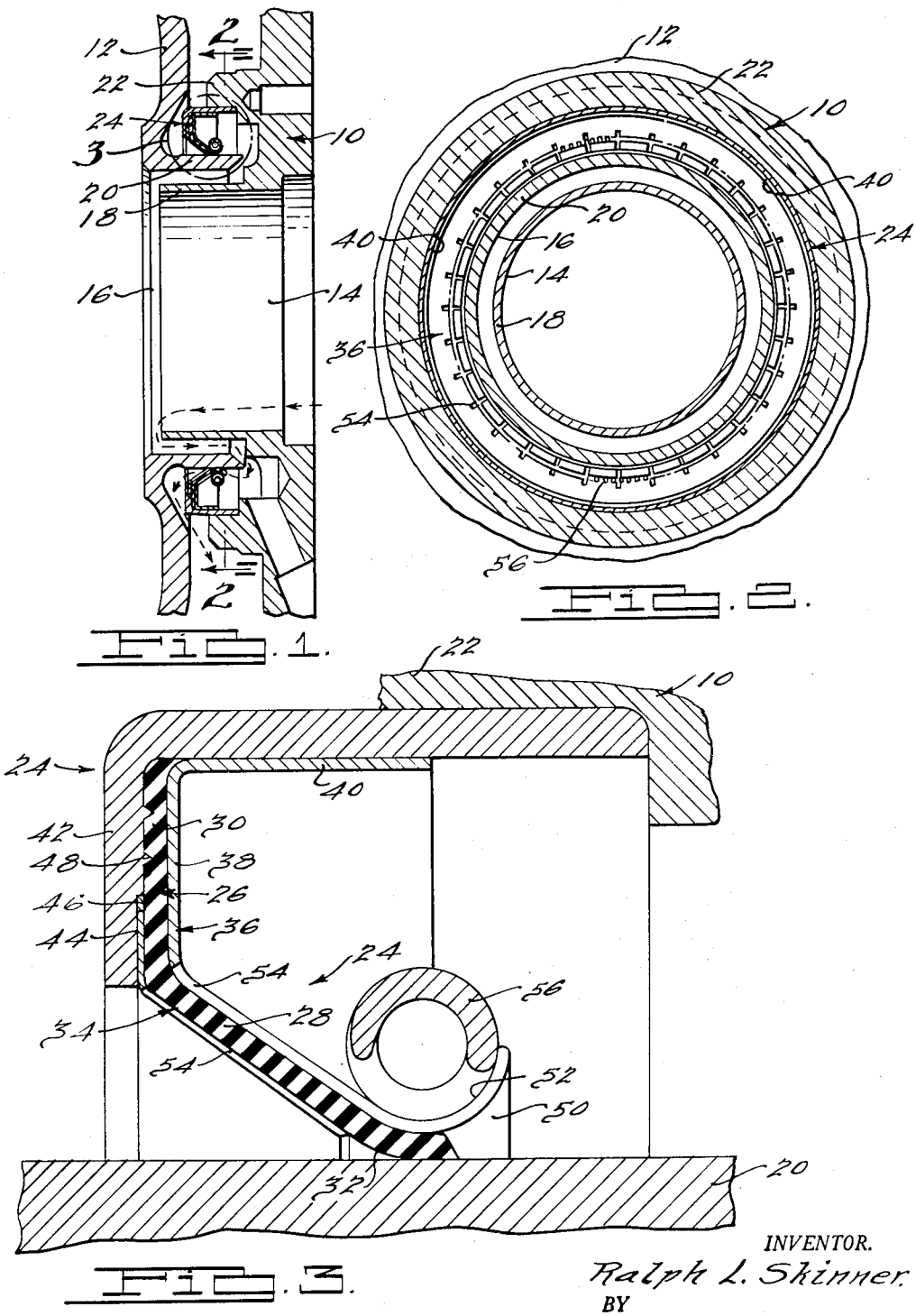

2,750,212

PLASTIC SEAL

Ralph L. Skinner, Detroit, Mich., assignor to Renniks Company, a partnership

Application October 9, 1952, Serial No. 313,947

5 Claims. (Cl. 286—5)

This invention relates to new and useful improvements in mechanical seals.

Many mechanisms containing fluid under pressure have rotating or reciprocating parts that must be sealed to retain the fluid. The seal must, of course, engage the moving part sufficiently closely to prevent leakage of the fluid, but it must not engage the part so tightly that it creates excessive resistance to movement of the part or generates undue friction with attendant heat and loss of efficiency. Special problems arise where the mechanism being sealed or the fluid contained thereby operate at or attain relatively high temperatures in operation or in the case of parts operating at high speed due to heat generated by friction between the part and the seal or where the fluid retained by the seal is an acid or other material which is corrosive or otherwise destructive of the material in the seal. Also, as a practical matter, a seal must be able to adapt itself to a rotating part which is slightly out of round or which is slightly eccentric, or, as in the case of a long shaft, evidences an appreciable "whip" in operation. In many instances the pressure that must be maintained between the sealing element and the moving part in order to effect a proper seal raises the frictional resistance between the parts to an objectionable and undesirable degree. Therefore, the art is constantly seeking a mechanical seal that will operate under the conditions set forth above with maximum sealing efficiency and with minimum frictional resistance.

The seal embodying this invention is pre-eminently satisfactory both from the standpoint of sealing efficiency and from the standpoint of frictional resistance. In addition, it has the very desirable property of being resistant to relatively high temperature conditions in the system being sealed and to most corrosive substances or heat which is so destructive of conventional seals such as rubber O rings and the like. The instant seal is fully operative in either static or dynamic environments, but it has particular utility for sealing reciprocating or rotating parts. For reasons pointed out above, sealing problems are greatest in the case of rotating parts, and it is for this purpose that the present seal is pre-eminently suited.

In the drawing forming a part of this specification and wherein like numerals are employed to designate like parts throughout the same, Fig. 1 is a fragmentary sectional view through a conventional mechanism requiring a rotary seal and illustrating a seal embodying the instant invention associated therewith, Fig. 2 is a transverse sectional view taken on the line 2—2 of Fig. 1, and Fig. 3 is an enlarged view of the portion of Fig. 1 enclosed in the circle 3.

The drawing illustrates the seal of this invention incorporated in an automatic transmission having a stationary housing 10 and a rotatable housing 12. Hydraulic liquid under pressure is contained within the housings 10 and 12, and communication between the parts is had through the openings 14 and 16. In this connection, it will be observed that the housings 10 and 12 have spaced, overlapping, axially extending flanges 18 and 20 and that the stationary housing 10 has, in addition, an outer annular flange 22 which retains a seal 24 arranged to engage and to seal the outer cylindrical surface of the flange 20. Suitable bearings (not shown) support the housing 12 for rotation and maintain the interfitting flanges 18 and 20 properly spaced apart.

The above environment was selected as a setting for the seal 24 because it presents a particularly difficult sealing problem and illustrates the difficulties sometimes encountered in the case of rotary seals. For one thing, it is difficult to maintain relatively large cylindrical surfaces such as the one presented by the flange 20 exactly round; and in a situation such as the one here shown, it frequently is difficult, if not impossible, in every instance, to mount the part 12 with the flange 20 exactly concentric to the surrounding flange 22. With seals conventionally used, considerable difficulty has been encountered with leakage of fluid under pressure, particularly under high temperature conditions, as indicated by the broken arrowed line in Fig. 1. In practice, the seal 24 must accommodate itself to out-of-round conditions resulting from permissible manufacturing tolerances, and in addition it must accommodate any eccentric motion of the flange 20. Further, it is exceedingly desirable in this particular situation that friction between the seal and the flange 20 be maintained at a minimum. The instant seal has been found to be pre-eminently satisfactory in this and analogous environments.

The seal 24 comprises a sealing element 26 of a suitable synthetic plastic resin material having a resistance to heat suitable for the particular environment in which the seal is to be used and the necessary mechanical, electrical, and chemical properties. Any plastic resin material having properties suitable for the particular environment in which the seal is to be used is satisfactory, and it will be apparent in this connection that the particular properties required of the sealing element may vary in different situations. In general, however, the properties most frequently considered are thermostability, mechanical strength, resistance to attack by corrosive agents and solvents, surface resistivity, rigidity, resistance to abrasion, moldability (particularly the ability to be molded into thin sections), machinability, dimensional stability, resistance to wear, and water absorption characteristics. In addition, the synthetic plastic resin material should preferably have a cold-flow characteristic, viz., the ability to flow or deform or extrude when a light, continuous pressure is applied thereagainst. These properties of most plastic resin materials suitable for use as sealing elements are known or can be readily determined by simple tests or from handbooks or other conventional sources of information. In general, polytetrafluorethylene plastics sold commercially under the trade name "Teflon" and "Kel-F" and synthetic fiber-forming polymeric amides such as "Nylon" have been found particularly suitable for this purpose.

In its preferred form, the sealing element 26 has a generally conical portion 28 which bears obliquely against the flange 20 to be sealed and a radial portion 30 by means of which the element 26 can be mounted in sealing relation to the part being sealed. In the drawing the seal is shown mounted on or attached to an outer stationary part and in sealing relation to an inner rotating part, but it will be readily appreciated that the sealing element can be adapted to seal either inwardly or outwardly. If the sealing element is to seal outwardly, the conical portion 28 would, of course, be at the outer side of the element. On the other hand, if the element is to seal inwardly as shown in the drawing, the conical portion is disposed at the inner side of the element. In the drawing, the conical portion 28 is therefore shown at the inner side of the sealing element 26 and it bears obliquely against the outer cylindrical surface of the flange 20.

Plastic resin materials of the type here under consideration set or deform under pressure, and it is desirable that the bearing portion of the sealing element 26 curve outwardly as at 32 so that the inner side of the element bears against the surface to be sealed. These materials have a low coefficient of friction and relatively high resistance to wear and heat, so that the element can be made to bear against the surface to be sealed in the manner shown without creating excessive frictional resistance between the seal and the rotating part. Also, plastic materials of the type suitable for use in this invention, and particularly the representative plastic materials referred to specifically above, have the property of swallowing up or absorbing small metallic particles or grit that may work between the sealing element and the surface sealed thereby. This property is exceedingly beneficial in use, as the gritty particles are taken up and retained by the plastic material and do not remain in the bearing surface of the sealing element so as to score or scratch the opposing surface. An additional advantage of these plastics is that they are not readily wet by fluids of any nature whatsoever. Thus they can be used effectively to seal oil or oily liquids and are particularly effective to prevent liquids from by-passing the seal through the joint between the sealing element and the part being sealed.

Plastic resin materials of the type here recommended have not been used heretofore for seals in environments of the type here shown, because these materials, as heretofore used, have not been able to withstand heat to which they are exposed in use. In many instances heat is inherent in the particular mechanism being sealed. The fluid retained by the seal becomes heated in use or many times it is heated at some point prior to the time it reaches the seal. In other instances, where the seal is used in high-speed operations such high heat is generated at the point of contact with the plastic that the latter is destroyed. In addition to the above, it has not been possible to use synthetic plastic materials of the type here under consideration in environments of the type shown in the drawing because the cold flow characteristics or inertness of the plastic material has made it impossible when used as in the prior art to keep the seal properly in engagement with the surface to be sealed. This has been particularly true if the surface to be sealed is out of round or if it has an eccentric or whip motion. The instant seal construction obviates all of these difficulties and permits the use of plastic sealing elements and the utilization of their inherently desirable characteristics under circumstances where they could not be used before.

To the above end it has been found necessary to maintain the plastic sealing element essentially thin and to confine the sealing element between front and back inherently resilient or springly rings of the type shown at 34 and 36. A thickness of .015" has been found most satisfactory for the sealing element. Seals of this thickness withstand high speed rotation adequately if combined and correlated with rings 34 and 36 in the manner hereinafter described and the seal has an exceedingly long life.

More particularly, both the rear and front retaining rings 34 and 36 are essentially thin so as to be adequately flexible or springly and both flatly contact or engage the conical portion 28 of the sealing element 26 over substantially the entire surface area thereof and from a point in close proximity to the sealing surface. In the particular form of the invention here shown the forward ring 36 has an outwardly extending flange portion 38 which extends along the corresponding radial flange portion 30 of the sealing element 26 and the flange 38 is provided at the outer periphery thereof with a forwardly extending annular flange 40 which fits snugly in a cup-shaped mounting or retainer 42. The rear ring 34 is similarly formed with a radially outwardly extending flange 44 which overlies a portion of the seal flange 30. The flange 44 is accommodated within an annular recess 46 in the retainer 42 so as to permit the portion of the sealing element flange 30 extending radially outwardly therefrom to flatly engage the inner radial surface of the retainer.

In order to prevent liquid under pressure from by-passing the seal between the sealing element 26 and the retainer 42, some means must be provided for interengaging the sealing element and the retainer. Any mechanical means that will accomplish this end can be employed and is within the scope of this invention. In the particular embodiment of the invention shown in the drawing this means is shown in the form of one or more annular ribs 48 provided on the inner radial surface of the retainer 42 and these ribs are embedded in the material of the sealing element as perhaps best shown in Fig. 3. In practice, the sealing element 38 and the two retaining rings 34 and 36 are first assembled together in a subassembly and the latter is then pressed into the retainer 42. When the subassembly is pressed forcibly against the bottom of the retainer 42, the cold-flow characteristics of the plastic material from which the sealing element 26 is made permits the ribs 48 to embed themselves relatively deeply into the plastic material to prevent fluid from thereafter passing between the sealing element and the retainer. In most installations, it is sufficient merely to press fit the flange 40 of the forward retaining ring 36 into the retainer 42, and the pressed frictional engagement of the flange with the retainer is sufficient to hold the parts securely assembled. However, if necessary or desirable, the flange 40 can be spot welded or otherwise secured positively to the retainer.

It is absolutely essential to proper functioning of the seal that the forward retaining ring 36 be essentially flexible and resilient, and it is further essential that the portion thereof overlying and adjacent to the sealing portion of the plastic material be radially contractible. However, the particular nature of the rearward retaining ring 34 may vary somewhat, depending upon the environment of the seal. In a low speed, dynamic system, viz., where the seal engages or is carried by a part which rotates or reciprocates at a relatively slow rate of speed, the backing 34 may be relatively inflexible. Also, in situations where the shaft or other part being sealed is perfectly centered in the seal, the backing retainer 34 may be relatively inflexible. However, as the operational speed of the part being sealed increases, the back or rearward retainer 34 must be made increasingly flexible. For exceedingly high-speed operations the rearward retainer 34 must be as flexible and resilient as the front retainer 36 and both retainers must be unsupported for a substantial distance from the part being sealed so as to permit the seal to move radially and stay with the part. The same thing is true where the part being sealed is out of round or where it is not precisely centered with respect to the seal or where the part tends to develop an eccentric motion or whip under all or certain operating conditions. The drawing illustrates a seal construction in which both of the retaining rings 34 and 36 are essentially flexible and resilient and in which both are unsupported adjacent to the part being sealed, as this construction is more or less universal in application and is suitable for either low- or high-speed operational environments. Although other materials having the necessary desired properties undoubtedly could be used, metallic rings have been found to be most satisfactory. In order to make the rings 34 and 36 as flexible and springy as possible without losing the confining function of the rings, the latter preferably are slotted from the leading or inner edges thereof and the slots 54 preferably extend substantially entirely across the conical portions of the rings. When the seal is mounted substantially back from the surface being sealed as shown in the drawing, the sealing element 26 and the retaining rings 34 and 36 are free to flex radially or laterally and thus accommodate themselves readily to any eccentric motion or whip of the part 20 or its equivalent engaged by the sealing element. Also, metallic retaining rings, although adequately flexible and resilient, are sufficiently rigid to confine the readily deformable plastic material of the sealing element 26.

It is a further critical feature of this invention that the retaining rings 34 and 36 be heat-conducting and that they extend to a point very close to the bearing surface of the sealing element 26. Also, it is desirable that the retaining rings contact and be in heat-exchange relation with the retaining ring 42, and further that the retaining ring itself be in contact with a relatively large body of metal such as the part 10. When these relationships exist, the retaining rings 34 and 36 serve the additional function of withdrawing heat from the bearing surface of the plastic sealing element and of conducting this heat back to the retainer 42 which in turn transmits it to the large mass of metal 10.

Thus, this particular relationship between the sealing element 26 and the retaining rings 34 and 36 plus the critical thinness characteristic of the sealing element itself, permits plastic materials to be used as seals under conditions which ordinarily create considerable frictional heat at the contact point of the seal without destruction of the sealing element while at the same time utilizing all the beneficial properties inherent in the plastic material as a sealing medium. If the plastic sealing element 26 is not kept thin enough it will soon heat up and disintegrate in use, but if it is made essentially thin and the retaining rings are brought close enough to the bearing surface of the sealing element, an efficient seal having an exceedingly long life is produced.

In order to adapt the seal for any out-of-round condition of the surface being sealed and to permit the sealing element to accommodate itself to eccentricity or whip of the rotating part, the front retaining ring 36 is curled outwardly over the bearing surface of the sealing element 26, as at 50, to define an annular, external spring seat 52. In the form of the invention shown, the slots 54 in the forward ring 36 are spaced relatively close together, as shown in Fig. 2, and the combined effect of the slots is to make the forward portion of the retaining ring radially expansible and contractible so that this portion of the ring can adapt itself easily and quickly to radial forces. In this manner the ring 36 remains constantly in engagement with the plastic sealing element 26 and is continuously though resiliently operative to press the latter against the part 20. In order to hold the retaining ring in constant pressed engagement with the sealing element 26 a garter spring 56 is provided around the sealing element and on the spring seat 52. It will be observed in this connection that the garter spring 56 is directly radially outwardly from the sealing element 26 so that pressure exerted by the spring is transmitted directly to the bearing surface and thus acts directly to hold the latter in engagement with the surface being sealed.

Plastic materials of the type here contemplated for use in the sealing element 26 are not, properly speaking, resilient, although in some cases they do tend to resume a former shape after a substantial period of time. This tendency of the plastic material to deform and stay in the deformed shape has made it difficult to adapt this material for use as a seal. However, if the sealing element is made essentially thin, as recommended herein, and if some means such as the garter spring 56 is maintained around the bearing surface of the element to exert a light but constant pressure thereagainst, the seal will adapt itself readily to irregularities in the surfaces being sealed and will maintain a proper sealing contact therewith even though the surface is out of round or eccentric and at high rotational speeds. It is desirable, in this connection, that the spring 56 press the plastic sealing element against the surface being sealed with light pressure so as to maintain heat developed at the point of contact at a minimum. However, it is of course essential that the spring apply sufficient pressure to keep the sealing element at all times in contact with the surface being sealed.

In addition to the above, the particular retaining ring and spring arrangement here shown, when used in combination with a plastic sealing element, performs the desirable function of gradually extruding the plastic material from between the retaining rings and in the direction of the surface being sealed so as to compensate for any plastic material worn away in use and thus materially increase the life which the seal otherwise would have. In this connection it will be apparent that the spring 56 tends to pull the expansible and contractible portion of the forward retaining ring 36, toward the rear retaining ring 34, and it is this constant pressure exerted by the spring which tends to squeeze the plastic material from between the rings. Manifestly, the plastic material, when confined between the retaining rings 34 and 36 and the retainer 42 in the manner shown, cannot move in any direction except toward the part 20. In practice, the pressure exerted by spring 56 is so light that the plastic material is not extruded appreciably unless wear occurs at the bearing surface of the plastic sealing element. However, in the event that wear does occur, the constant light pressure of the spring 56 is sufficient to extrude the plastic material outwardly, and in actual practice it has been found that, if the forces are properly balanced and maintained, the rate of extrusion is substantially equal to the rate at which the plastic material wears away. As pointed out above, the plastic material wears exceedingly slowly as it is inherently essentially "oily" to the touch and has an exceedingly low coefficient of friction. It appears that seals of this type may in many instances well last as long as the mechanisms in which they are mounted.

Having thus described the invention, I claim:

1. A seal assembly comprising an essentially thin sealing element of relatively inert plastic resin material provided with a conical portion having a sealing surface, retaining rings on opposite sides of said sealing element, said retaining rings having conical portions confining and intimately contacting the conical portion of said sealing element over substantially the entire surface thereof engaged by said rings, said retaining rings being inherently flexible and resilient and of heat-conducting material, both of said retaining rings extending to a point in proximity to the sealing surface of said sealing element so as to conduct heat created in use at said sealing surface, the portion of at least one of said retaining rings in proximity to the sealing surface of said sealing element being radially expansible and contractible, spring means coactive with said expansible and contractible portion of said one of said retaining rings holding the latter pressed lightly against said sealing element, and a retainer of heat-conducting material carrying said sealing element and said retaining rings and physically contacting said retaining rings at points remote from the sealing surface of said sealing element so as to absorb heat conducted from said sealing surface by said retaining rings.

2. A seal assembly comprising an annular sealing element of plastic resin material having an outer radial flange portion and an inner, conical portion, essentially thin metallic rings in front of and behind said sealing element, both of said rings having outer radial flange portions and inner conical portions engaging flatly against corresponding portions of said sealing element, said front ring being slotted to permit radial expansion and contraction thereof and said slotted portion defining an annular spring seat, a garter spring surrounding and engaging said spring seat exerting pressure against said sealing element, and a mounting engaging the outer radial flange portions of said element and said rings leaving substantially the entire conical portions thereof unsupported and unrestricted, the unsupported conical portions of said rings being freely flexible so that the seal accommodates itself readily to lateral movements of the parts sealed thereby, and said rings cooperating with said garter spring to exert a continuous pressure against said sealing element tending to extrude the latter from between said rings and in the direction of the part being sealed.

3. A seal comprising an annular, generally conical sealing element of plastic resin material having a sealing edge portion, front and back generally conical rings on opposite sides of said sealing element confining the latter therebetween and engaging the same intimately over substantially the entire surface thereof contacted thereby, said back sealing ring being spaced back from the sealing edge portion of said element and said front ring projecting beyond said edge portion, both of said rings being essentially flexible and resilient and said front ring being slotted from the leading edge thereof to provide a radially expansible and contractible portion in proximity to the sealing edge portion of said sealing element, a garter spring surrounding the slotted portion of said front ring exerting a constricting force thereagainst and holding the same pressed against said sealing element so as to hold the sealing edge portion of the latter constantly in engagement with a part to be sealed thereby, and an annular mounting means for the assembled sealing element and rings.

4. In combination, inner and outer parts, one rotatable relative to the other and said rotatable part having a cylindrical surface to be sealed; an annular, generally conical sealing element of plastic resin material bearing obliquely against the mentioned surface of said rotatable part, a relatively flexible and resilient back-up ring supporting said sealing element over the entire surface area engaged thereby from a point adjacent to and extending from said rotatable part, a flexible and resilient retainer ring on the front of said sealing element engaging flatly against the latter over the entire surface area engaged thereby and extending from a point adjacent to and away from said rotatable part, the portion of said retainer ring immediately adjacent to said rotatable part being radially contractible so as to be constantly engageable with said sealing element even though deformation of the sealing element occurs in use, and spring means bearing of the radially contractible portion of said retainer ring tending to constrict the latter so as to hold the same constantly in engagement with said sealing element and to hold said sealing element constantly against said rotatable part, and also to exert pressure against said sealing element tending to extrude the same from between said rings and in the direction of said rotatable part to compensate for wear of said sealing element in use.

5. In combination, inner and outer parts one rotatable relative to the other, and said rotatable part having a cylindrical surface to be sealed; an annular, generally conical sealing element of plastic material bearing obliquely against the mentioned surface of said rotatable part, a relatively flexible and resilient back-up ring supporting said sealing element over the entire surface area engaged thereby from a point adjacent to and extending from said rotatable part, a flexible and resilient retainer ring on the front of said sealing element engaging flatly against the latter over the entire surface area engaged thereby and extending from a point adjacent to and away from said rotatable part, the portion of said retainer ring immediately adjacent said rotatable part being radially contractible so as to be constantly engageable with said sealing element even though deformation of the sealing element occurs in use, spring means bearing on the radially contractible portion of said retainer ring tending to constrict the latter so as to hold the same constantly in engagement with said sealing element and to hold said sealing element constantly against said rotatable part, and also to exert pressure against said sealing element tending to extrude the same from between said rings and in the direction of said rotatable part to compensate for wear of the sealing element in use, and an annular mounting connecting the sealing element and said rings to said stationary part, said mounting being spaced substantially from said rotatable part so that said sealing element and said rings are freely flexible laterally to accommodate lateral movement of said rotatable part.

References Cited in the file of this patent

UNITED STATES PATENTS

| | | |
|---|---|---|
| 1,819,871 | Clark | Aug. 18, 1931 |
| 2,233,147 | Victor | Feb. 25, 1941 |
| 2,264,413 | Siegerist | Dec. 2, 1941 |
| 2,398,376 | Hillman | Apr. 16, 1946 |
| 2,434,484 | Chambers | Jan. 13, 1948 |
| 2,599,149 | Allen | June 3, 1952 |